(12) United States Patent
Vaca et al.

(10) Patent No.: US 11,394,475 B1
(45) Date of Patent: Jul. 19, 2022

(54) METHOD AND SYSTEM FOR INTERFERENCE DETECTION AND CLASSIFICATION

(71) Applicant: Spectrum Effect Inc., Kirkland, WA (US)

(72) Inventors: Rodrigo Vaca, Kirkland, WA (US); Rekha Menon, Kirkland, WA (US); Eamonn Gormley, Kirkland, WA (US)

(73) Assignee: Spectrum Effect Inc., Kirkland, WA (US)

( * ) Notice: Subject to any disclaimer, the term of this patent is extended or adjusted under 35 U.S.C. 154(b) by 69 days.

(21) Appl. No.: 17/089,628

(22) Filed: Nov. 4, 2020

(51) Int. Cl.
  *H04W 24/10* (2009.01)
  *H04B 17/345* (2015.01)
  *H04W 24/08* (2009.01)

(52) U.S. Cl.
  CPC .......... *H04B 17/345* (2015.01); *H04W 24/08* (2013.01); *H04W 24/10* (2013.01)

(58) Field of Classification Search
  CPC ..... H04B 17/345; H04W 24/08; H04W 24/10
  See application file for complete search history.

(56) References Cited

U.S. PATENT DOCUMENTS

2019/0349103 A1\* 11/2019 Wang ................ H04B 7/06
2020/0380314 A1\* 12/2020 Takagi ............... G06K 9/6228

\* cited by examiner

*Primary Examiner* — Chuong A Ngo

(57) ABSTRACT

A method and system that separate thermal and background interference noise measurements from interference measurements can determine periodicity of an event using active percentage values. The active percentage value of an interference event may be determined based on unsupervised machine learning on a per-Recording Output Period (ROP) basis. The active percentage of the interference event may be used with other characteristics to help classify the interference source causing the interference. After measuring RF energy at a base station in the network at predetermined intervals over a plurality of consecutive first of time periods, for each time period, a method arranges binned values of the measured energy into at least one cluster, determines whether each cluster of the at least one cluster represents noise or interference, and characterizes the interference, and the method indicates a source of the interference.

20 Claims, 11 Drawing Sheets

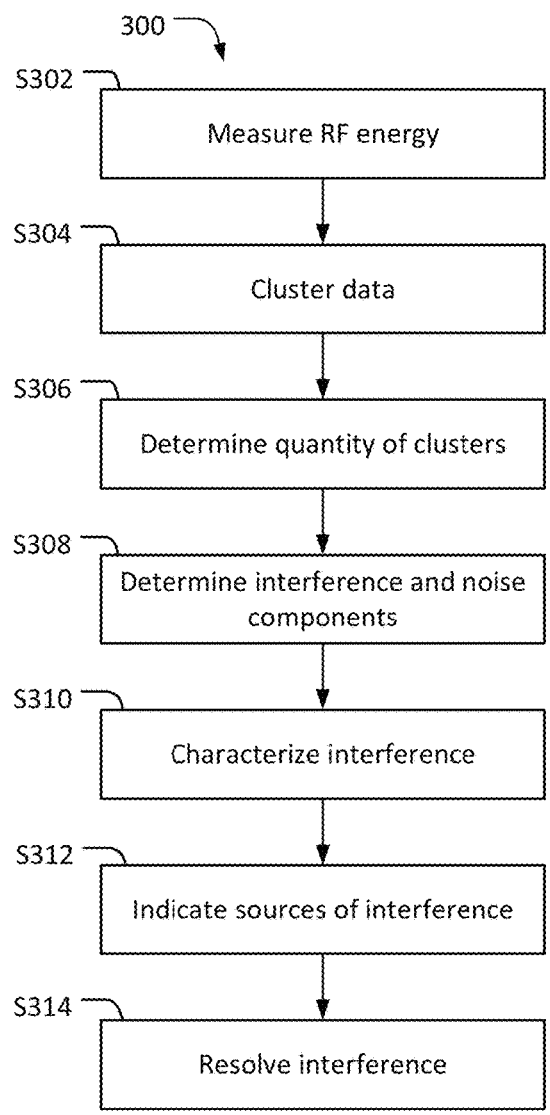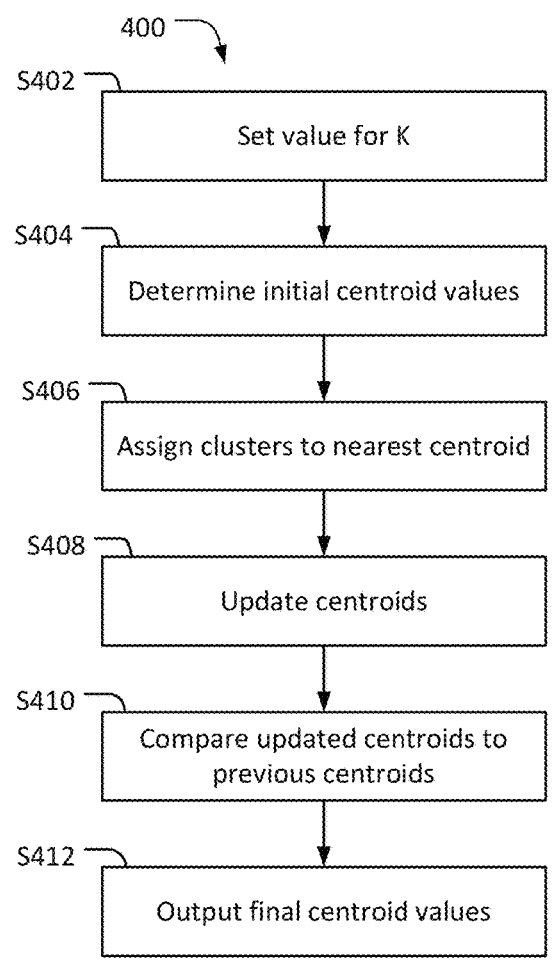
FIG. 3
FIG. 4

METHOD AND SYSTEM FOR INTERFERENCE DETECTION AND CLASSIFICATION

BACKGROUND

The wide adoption of mobile devices along with ubiquitous cellular data coverage has resulted in an explosive growth of mobile applications that expect always-accessible wireless networking. This growth has placed demands on network performance including demands for fast and reliable communication paths, which causes increasing strain on the limited radio-frequency (RF) spectrum allocated to wireless telecommunication. Accordingly, efficient use of the limited spectrum is increasingly important to the advancement of wireless communication technology.

Interference is a barrier to efficient use of wireless spectrum. Modern wireless communications operate in interference limited environments where signal quality to and from network subscriber devices is limited in part by interference from other users served by the same or nearby cells. The design and optimization of these networks are based on having clear spectrum occupied only by radio frequency transmitting equipment associated with the specific network. However, this ideal of clear spectrum occupied only by intended users of the system is not always achieved.

Real world systems often experience unexpected network interference which may originate from intentional and or unintentional radio frequency (RF) generating sources. These potential interference sources include many things such as industrial machinery, electronics test equipment radiating signals in the bands of interest, undesired mixing products generated by the licensed system itself and illegal radio sources. The result of these system interference sources is degraded system service and reduced wireless network capacity and coverage as the intentional system signals suffer capacity and quality losses due to these interferers.

Conventional approaches for detecting and subsequently locating these network interferers typically involve intentionally disabling transmitting equipment across large areas of the network coverage area and searching for interference sources using sensitive receiving equipment and directional antennas. These methods are very costly as they involve turning off the revenue-generating network equipment and deploying teams in the field, typically during maintenance windows, which are low network utilization times such as the middle of the night. If network interferers are only present outside of these search times, then they will not be detected or located as part of these searches.

Another approach to interference detection involves deployment & utilization of dedicated energy measurement probes throughout the serving areas. Energy detection probes in this context are radio receiving devices that quantify energy levels detected within defined radio frequency bands, as opposed to data level probes that detect information in RF transmissions. However, there are substantial costs associated with installing, maintaining and monitoring probes, and a large number of probes would be required to effectively cover network areas.

Wireless networks measure and collect a staggering amount of performance data. For example, a single base station may support dozens of cells, and measure performance information for each cell at a high sampling rate. Because the amount of performance data collected in a cellular network is so large, it is impractical to communicate that data in its raw form.

To reduce bandwidth requirements for reporting measurements, instead of making a sequence of measurements available from the network equipment, a histogram of measurements over an observation interval may be compiled and made available. However, it can be difficult to obtain useful information for interference from binned performance data.

TECHNICAL FIELD

Embodiments of the present disclosure relate to a system and process that can discriminate between different types of interference and noise and determine characteristics of interference experienced by a node in a wireless communications network.

BRIEF SUMMARY

Embodiments of the present disclosure may separate thermal and background interference noise measurements from interference measurements, and indicate whether a base station or cell is experiencing interference from within a wireless communications network, or from sources outside of the network.

Embodiments of the present disclosure may be implemented as a non-transitory computer readable medium with computer-executable instructions stored thereon which, when executed by a processor, performs one or more of the steps described below.

In an embodiment, a method for a wireless telecommunications network includes measuring RF energy at a base station in the network at predetermined intervals over a plurality of consecutive first of time periods, and for each time period, arranging binned values of the measured energy into at least one cluster, determining whether each cluster of the at least one cluster represents noise or interference, and characterizing the interference, and indicating a source of the interference. Indicating the source of interference may include indicating whether the base station is experiencing interference from within the network, and indicating whether the base station is experiencing interference from a source external to the network. Embodiments may identify a source of interference that is external to the network, and in particular, a non-cellular source of interference such as an air conditioning system or a television signal.

In an embodiment, a wireless telecommunication system includes at least one base station that measures RF energy at predetermined intervals over a plurality of consecutive time periods, one or more processors, and memory storing instructions that, when executed by the one or more processors, cause the system to, for each time period, arrange binned values of the measured energy into at least one cluster, determine whether each cluster of the at least one cluster represents noise or interference, and characterize the interference, and the system indicates a source of the interference.

BRIEF DESCRIPTION OF THE DRAWINGS

FIG. 3 illustrates an embodiment of a process for improving network performance using anomalous node detection FIG. 4 illustrates an embodiment of a process for clustering data.

DETAILED DESCRIPTION

A detailed description of embodiments is provided below along with accompanying figures. The scope of this disclosure is limited only by the claims and encompasses numerous alternatives, modifications and equivalents. Although steps of various processes are presented in a particular order, embodiments are not necessarily limited to being performed in the listed order. In some embodiments, certain operations may be performed simultaneously, in an order other than the described order, or not performed at all.

Numerous specific details are set forth in the following description in order to provide a thorough understanding. These details are provided for the purpose of example and embodiments may be practiced according to the claims without some or all of these specific details. For the sake of clarity, technical material that is known in the technical fields related to this disclosure has not been described in detail so that the disclosure is not unnecessarily obscured.

Figure 1:
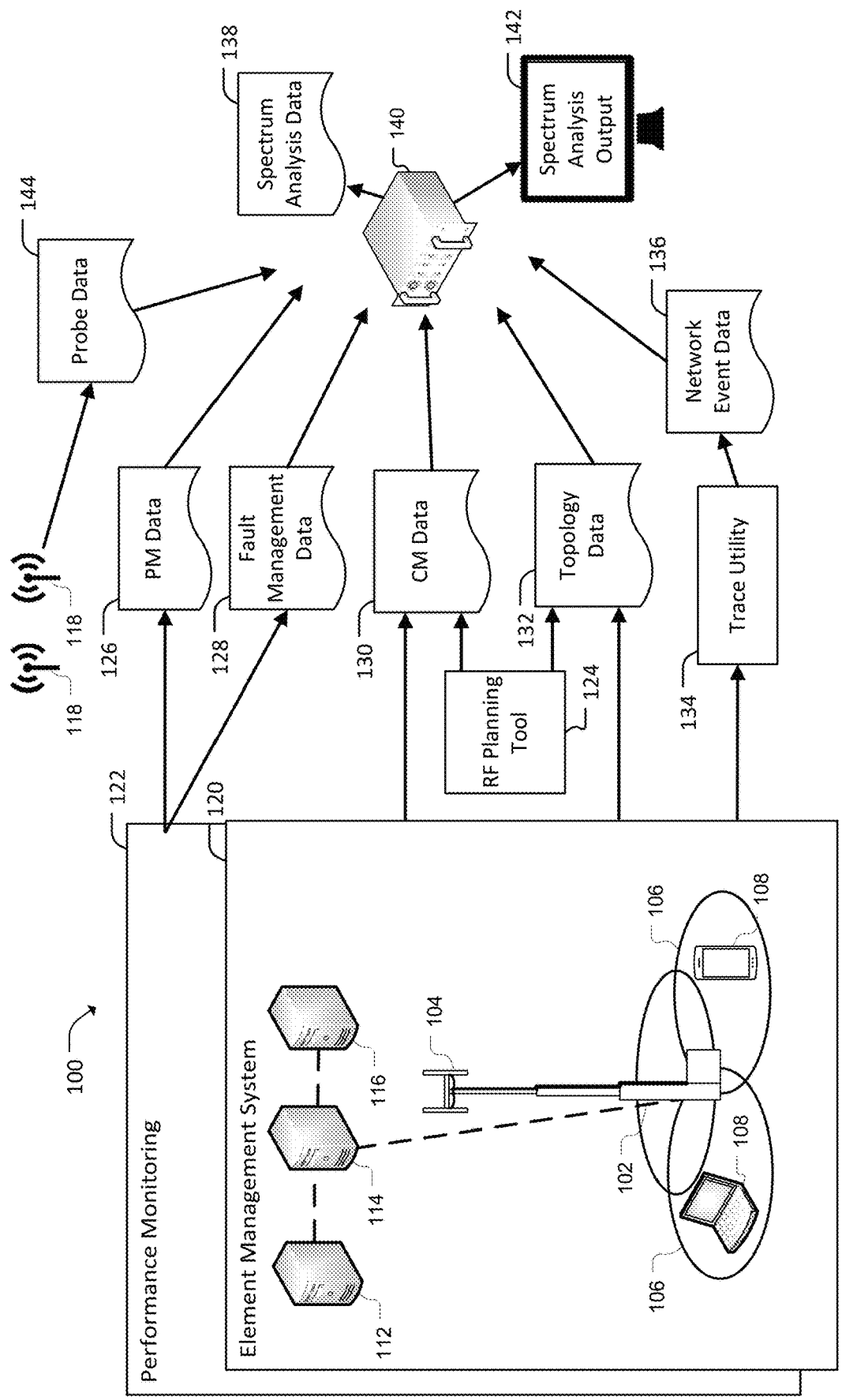
FIG. 1 illustrates a system for identifying interference in a cellular communications network according to an embodiment.

FIG. 1 illustrates a networked spectrum analysis system 100 according to an embodiment. The system 100 integrates information from available wireless network sources to detect, isolate, characterize and locate undesired radio frequency interference in the context of a wireless network. Sources of this information, which are hardware elements of a wireless network, are available in typical wireless cellular networks, but they are not conventionally connected and configured in the manner suggested by this disclosure. In particular, the spectrum analytics server 140 is a novel component of a telecommunications network.

A radio access portion of system 100 may include one or more base stations 102, each of which are equipped with one or more antennas 104. Each of the antennas 104 provides wireless communication for user equipment 108 in one or more cells 106. As used herein, the term "base station" refers to a wireless communications station that serves as a hub of a wireless network. For example, in a Long Term Evolution (LTE) cellular network, a base station may be an eNodeB.

The base stations 102 may provide service for macrocells, microcells, picocells, or femtocells 106. FIG. 1 shows an embodiment in which base station 102 provides wireless communication services to three cells 106. The cells may be specific to a particular Radio Access Technology (RAT) such as GSM, UMTS, LTE, NR, etc.

Due to the directionality of some RF antennas 104, each base station 102 may serve a plurality of cells 106 arrayed about the base station site. In a typical deployment, a base station 102 provides three to six cells 106, which are deployed in a sectorized fashion at a site. In other embodiments, one or more base station 102 may be outfitted with an omnidirectional antenna that provides service to a single cell for a given RAT.

Multiple base stations 102 may be present at a site and each base station may support one or more cellular communications technologies (e.g., a base station may support UMTS and LTE cells). The one or more UE 108 may include cell phone devices, laptop computers, handheld gaming units, electronic book devices and tablet PCs, and any other type of common portable wireless computing device that are provided with wireless communications services by a base station 102.

The system 100 may include a backhaul portion 110 that can facilitate distributed network communications between core elements 112, 114 and 116 and one or more base station 102 within a cellular network. In an embodiment, the backhaul portion of the network includes intermediate links between a backbone of the network which is generally wire line, and sub-networks or base stations 102 located at the periphery of the network. The network connection between any of the base stations 102 and the rest of the world may initiate with a link to the backhaul portion of a provider's communications network. A backhaul 110 may include an X2 connection through which base stations 102 communicate with one another directly.

The core network devices 112, 114 and 116 may be any of a plurality of network equipment such as a Radio Resource Manager (RRM), a Mobility Management Entity (MME), a serving gateway (S-GW), a Radio Network Controller (RNC), a base station controller (BSC), a mobile switching center (MSC), a Self-Organizing Network (SON) server, an Evolved Serving Mobile Location Server (eS-MLC), a Home Subscriber Server (HSS), etc. Persons of skill in the art will recognize that core network devices 112, 114 and 116 are different depending on the particular RAT or set of RATs that are present in the network. The core network devices support a radio access portion of the network that includes the base stations 102.

Elements of the communications network 100 are part of an Element Management System (EMS) 120 and a Performance Monitoring (PM) system 122. The PM system 122 may include base stations 106 as well as core network equipment that collect and process performance data and performance metrics for the network. A spectrum analytics server 140 interfaces with various network components, including components of the PM system 122 and the EMS 120.

Although FIG. 1 shows the spectrum analytics server as a single, discrete component, embodiments are not so limited. For example, in other embodiments, components of the spectrum analytics server 140 may be distributed among multiple computing entities. In addition, hardware for the spectrum analytics server may perform processes not directly related to interference.

The performance monitoring system 122 generates performance data 126 for the wireless network. The PM data 126 may be derived from observations of network performance, which may be reported at a predetermined time interval, e.g., every minute, 5 minutes, 15 minutes, hourly or daily. PM data 126 may include raw event counts (e.g. counts of dropped calls or handover failures during the observation period) or complex derived performance indicators (e.g. noise rise normalized by user loading, Channel Quality Indicator (CQI) distribution statistics normalized by data volume, etc.). PM data 126 may include raw or aggregated performance data.

In some embodiments, PM data 126 includes data input from a dedicated PM tool, as well as data received directly from EMS 120, or elements of the Operations and Support System (OSS). In an embodiment, PM data 126 may be derived directly from network event data by the spectrum analytics server 140. For example, in an embodiment, when event data 136 is available to the spectrum analytics server 140, the server may aggregate individual events to create equivalent PM counters and Key Performance Indicators (KPIs). Thus, in some embodiments, PM data 126 is derived from sources other than a PM system 122.

Fault Management Data 128 may be transmitted from the PM system 122 to spectrum analytics server 140. Fault Management Data 128 includes, for example, alarm data that indicates performance issues at one or more cell site.

Configuration Management (CM) data 130 is input to the spectrum analytics server 140 from EMS 120. CM data 130 includes the current configuration of various wireless network equipment, such as the configuration of base stations 102 and core components such as Radio Network Controllers.

CM Data 130 is quasi-static and typically only updated as a result of network optimization such as cell splitting, cell ID reassignment, changes in operating frequency or transmit power, etc. CM data 130 may include pertinent information such as cell technology (e.g., 2G GSM, 3G UMTS, 4G LTE, 5G NR) associated with physical and logical network elements, operating frequency, transmit power, reuse codes, type of cell (e.g. macro, micro, pico cell), and other information related to the configuration of the radio network elements.

Topology data 132 is data relating to the location and orientation of network elements, including information such as the antenna latitude and longitude of a base station 102, antenna height, pointing angle for sectorized antennas, antenna beamwidth, site deployment type (e.g. indoor, outdoor, distributed antenna system, etc.), etc. In addition to interference detection and characterization, topology data 132 may be used to aid in correlating PM data 126 and network event data 136 against actual physical locations, and for understanding physical distance relationships between network elements.

RF planning tool 124 has network planning information used to determine cell site positions and pertinent parameters such as sector pointing angles. Network parameters established via automated or manual network planning processes may be used to configure the actual network equipment and serve as source information for some of the CM data 130 and Topology data 132. Alternative embodiments may include a direct data connection between entities that perform RF planning functions and the spectrum analytics server 140, provided that the network CM data 130 and topology data 132 is available to support processes described in this disclosure.

Network event data 136 represents discrete network events that are typically logged by network elements. Network event data 136 may include information pertaining to the start and termination of phone calls, information regarding handover of UEs 108 between network cells 106, measurement reports sent by UEs to network elements, as well as periodic reporting at intervals of as low as several seconds or less between reporting periods. Network event data 136 may be available via a continuous streaming mechanism, or recorded and stored in files at network elements that contain, for example, fifteen to thirty minutes or more of network event data. Because event data 136 is reported at intervals of a few seconds, it can be used to determine variance of conditions over time at relatively short intervals, such as five minutes, one minute, 30 seconds, or as low as the reporting interval, which may be less than one second.

Network event data 136 includes call event data, or cell trace data according to LTE terminology. Call trace data includes information identifying makes and models of UEs 108, and is typically used by operators to determine device-specific network faults, e.g. that a particular cell phone model has an unusual rate of handover failures under certain conditions. Examples of call event data 136 include tracking area messages, request for retries, RSSI measurements, and protocol messages. Network event data 136 is not conventionally used for interference detection, characterization or localization.

Tools supporting the collection of network event 136 data may be configured to collect selected event types, or to subsample the messaging to a subset of active users. Smaller size network event files are useful in measuring implied loading on network data transport such as wireless base station backhaul. When properly configured, network events provide high resolution and near real-time information regarding the operation of targeted network base stations 102, which can be used as part of the interference detection processes described by this disclosure.

The collection point for network event data 136 varies between specific wireless technologies and may vary in vendor-specific implementations. For instance, network event data 136 is typically collected at the RNC entity in 3GPP defined 3G networks (i.e., UMTS, HSPA), but network event data 136 is collected by the eNodeB entity in 4G LTE systems. Network event recordings may be pulled directly from the network elements that store the events by the spectrum analytics server 140, or automatically stored on a separate data storage server, or staging server, such that external systems such as the spectrum analytics server 140 may access network event data 136 without incurring additional data loading on the network elements. Accordingly, it should be understood that network event data 136 may be collected, stored and retrieved in various ways in different embodiments.

The network event data 136 may be collected by a trace utility 134 that is integrated with a cellular network. Trace concepts and requirements are explained, for example, in the Third Generation Partnership Project (3GPP) Technical Specification TS 32.421.

An embodiment may use network event data 136. In such an embodiment, spectrum analysis does not use input from a dedicated Performance Monitoring system 122, but may derive base station performance indicators directly from network event data 136. In such an embodiment, network event data records may be aggregated.

Embodiments of this disclosure may utilize additional information sources beyond the sources illustrated in FIG. 1, such as information provided by SON (Self Organizing Network) tools, including analysis and insight into neighbor relationships not readily apparent from the sources listed above. Additional external integrations may also include radio frequency propagation planning tools that may be used to enhance accuracy of interference detection and interference localization.

Also shown in FIG. 1 is a plurality of energy sensing probes 118, which may be dedicated to the task of sensing energy in particular frequencies and reporting energy detection results. RF Energy sensing probes 118 may be installed at various locations in a network, and may be tuned to detect energy on one or more frequencies that are used for wireless communications. Although embodiments of this disclosure do not require the deployment of dedicated energy sensing probes 118, their use is not precluded.

In an embodiment that uses dedicated energy detection probes 118, energy measurements derived directly from the detection probes are used in conjunction with or in place of energy measurements derived from network event data 136 as inputs to the spectrum analytics server 140. Subsequently, the measurements from dedicated energy detection probes 118 may be correlated with known probe positions and probe configuration characteristics (e.g. directional antennas) as well as current network loading data to enhance the detection of undesired radio frequency interference within the network.

Probe data may in some cases be broadband and cover wider spectrum segments than the operational wireless network, and as such may be used to monitor bands adjacent to or even highly separated from current wireless bands. Such broadband spectrum analytics sensing may be used to support frequency agile spectrum sharing solutions whereby internal band metrics, e.g. network event data correlated with topology and CM data, as well as probe supported broad band metrics, to enhance performance of spectrum analytics.

The spectrum analytics server 140 represents a specific processing device that interfaces with one or more of the external data sources described above. The spectrum analytics server 140 may perform one or more of anomaly and interference detection, analysis, comparison, characterization and localization processes described in this disclosure. In an embodiment, the spectrum analytics server 140 is physically located in an operator's Network Operations Center (NOC). From a logical perspective, the spectrum analytics server 140 is located in the Operations Support System (OSS) plane. The spectrum analytics server 140 may perform one or more of the specific processing steps described below.

Figure 2:
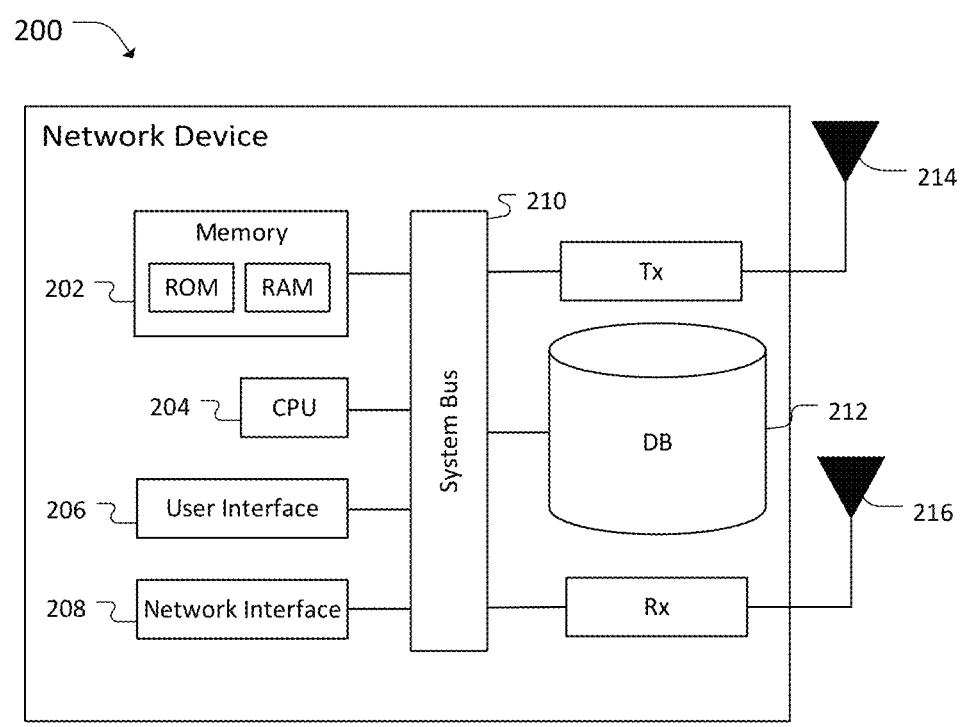
FIG. 2 illustrates a network device according to an embodiment.

FIG. 2 illustrates a block diagram of a network device 200 that may represent UE 108, network controller devices 110, 112 and 114, a spectrum analytics server 140, etc. The network device 200 has one or more processor devices including a CPU 204. The CPU 204 is responsible for executing computer programs stored on volatile (RAM) and nonvolatile (ROM) memories 202 and a storage device 212 (e.g., HDD or SSD). In some embodiments, storage device 212 may store program instructions as logic hardware such as an ASIC or FPGA. The storage device 212 and ROM of memory 202 are non-volatile computer readable media that may have computer executable instructions stored thereon which, when executed by the CPU 204, cause the network device to perform one or more operations according to embodiments of the present disclosure.

The network device 200 may also include a user interface 206 that allows a user to interact with the network device's software and hardware resources and to display the performance and operation of the system 100. In addition, the network device 200 may include a network interface 206 for communicating with external devices, and a system bus 210 that facilitates data communications between the hardware resources of the network device. If the Network device 200 has wireless connectivity, it may have a transmitter 214 and a receiver 216, each of which may include one or more antennas that operate on one or more frequencies.

Wireless network nodes in telecommunication networks make periodic measurements of interference. The interference measurements can be used to adapt network parameters to optimize performance in the presence of interference. However, it is important to characterize the interference in order to implement appropriate optimization processes.

Causes of localized non-network interference include sparking transformers, industrial machinery and rogue transmitters. In addition to localized non-network interference, cells experience interference from transmissions within the network itself. In the present disclosure, the term "internal interference" refers to interference from transmissions within the network itself, while the term "external interference" refers to interference from non-network sources.

Processes used to handle localized non-network interference are different from processes used to handle interference from within the network. Non-network interference is typically handled by locating and eliminating the interference source. For example, interference from a sparking transformer can be mitigated by replacing the transformer. Network interference can be handled in a number of ways, including adjusting network parameters such as power, frequency, antenna azimuth and beamwidth, and changing how transmissions are scheduled. In order to implement the most effective processes for handling interference, it is important for networks to accurately detect and characterize the interference.

Embodiments of the present disclosure include a method and system that separate thermal and background interference noise measurements from interference measurements, and determine periodicity of an event using active percentage values. The active percentage value of an interference event may be determined based on unsupervised machine learning on a per-Recording Output Period (ROP) basis. The active percentage of the interference event may be used to help classify the interference source causing the interference.

In telecommunication networks, performance data including received interference power data is often made available in histogram form. A histogram typically consists of N bins and N+1 associated bin edges. The histogram bin edges n and n+1 ($1 <= n <= N$) represent the lower and upper bounds of interference values associated with histogram bin n.

Each bin has an associated bin frequency value, which represents the number of occurrences during a reporting period of interference values measured by a network element that fall between the bins' associated lower and upper edge values. N histogram bin center values may also be specified for the purposes of calculating a weighted average of the bin values. The histogram center values are often defined as the average of the histogram bin edges associated with a bin, but may be any value between the histogram bin edges.

The available information for a potential interference source includes measured power at multiple cell sites, which is stored in the PM data 126 of a PM system 122. Normally, the received interference power data stored in each network element is a combination of thermal and other background noise, and external or co-channel interference from mobile users connected to neighbor cell sites as well. Hence, certain procedures separate interference magnitude from the combined measured interference data at each network element.

The problem of separating interference from thermal noise is facilitated by finding which set of bins from the histogram contain interference values caused by the interference event. The remaining set of bins can be considered to be part of thermal and other background noise.

Obtaining an Event Active Percentage Value (EAPV) associated with an interference event is helpful since a reliable interference magnitude value provides improved accuracy when used as input for a wide variety of interference detection methods such as anomaly detection, interference source classification and interference source localization.

The EAPV is conventionally obtained by using a static threshold, and everything above the threshold is considered part of the interference magnitude. This solution can be computationally inexpensive. However, by using a static threshold, a significant portion of the thermal and other background noise components can be unintentionally considered as part of the interference magnitude, thereby affecting the accuracy of the results.

Embodiments of the present disclosure provide a more accurate process for EAPV determination that does not exclusively rely on a threshold for the interference magnitude determination. Embodiments may employ unsupervised machine learning to identify the number of interference events or clusters which are present in a histogram, and use a thermal noise threshold to discriminate which of the clusters does not belong to the interference magnitude.

Unsupervised machine learning techniques may facilitate the analysis of raw datasets, thereby helping in generating analytic insights from unlabeled data. Clustering may be performed as an unsupervised machine learning task that finds patterns of unlabeled data in the form of clusters. By using these techniques, the bins in the histogram of the received interference power can be grouped to separate the interference signal from the thermal noise.

FIG. 3 illustrates an embodiment of a process 300 for identifying and classifying interference in a network. Process 300 may begin with measuring energy at RF frequencies at S302. The measurements may be performed by base stations in a network, and may reflect the total received power that is present in a portion of the RF spectrum.

In more detail, network elements such as eNodeBs may conduct uplink energy measurements at predetermined intervals, such as every millisecond, or every one or two seconds. In some embodiments, the energy measurements are received wideband power or uplink Received Signal Strength Information (RSSI). Measurements of uplink energy may be in units that map to dBm of power on a range of approximately −120 dBm to −58 dBm.

Performance data may be reported by a Radio Access Network (RAN) as PM data 126. PM data 126 is often reported in the form of histograms in which measurements are aggregated over some time interval such as an ROP. In some embodiments, PM data 126 may be provided as a probability density function (PDF), which is a histogram for which probabilities are normalized to a probability of 1 by a normalizing constant. Some vendors also create and report KPIs (Key Performance Indicators) constructed from the PM Data 126. KPIs are typically reported at 15-minute intervals.

In an embodiment, the network measurements are stored and accessed by a spectrum analytics server 140. In an example, a spectrum analytics server 140 receives RSSI measurements as PM data 126 from a PM system 122, stores the PM data in a memory, and then accesses the PM data in the memory.

The performance data that is measured at S302 is arranged into clusters at S304. Clustering PM data 126 will now be described with respect to process 400, which is illustrated in FIG. 4. Clustering the performance data can be helpful for discriminating between interference and noise that is present in the binned PM data, as well as discriminating between internal and external interference signals that are present in the data.

Process 400 has some similarities with K-means clustering. K-means is often used for clustering sets of multi-dimensional data. In a K-means process, the number of clusters, K, is provided to the algorithm, and the number of clusters defines the number of centroids which are implemented in a dataset. The centroid is the location that represents the center of the cluster. Hence, each data point in the set is allocated to each of the clusters through reducing the in-cluster sum of squares.

Clustering the data in process 400 includes a step S402 of determining a number of centroids for the binned PM data. In an embodiment, process 400 is performed multiple times for different values of K. Accordingly, step S402 may include setting a number K of clusters to consecutive whole numbers such as 1, 2 and 3. The number of K values evaluated by process 400 may be greater than 3, and may differ depending on the resolution of spectral data. After clusters have been identified for each value of K, the resulting clusters are compared with each other to see which value of K results in the optimal clustering.

Values for the centroid(s) of the N clusters is determined at S404. The centroids may be evenly distributed across all frequency bins with non-zero values. For example, the data accessed at S302 may include a plurality of bins for a given time period, where each bin represents an RF received power level in dB. The count for each bin represents the number of times within an ROP that RF received power detected by anode was received for the associated bin.

Depending on the levels of noise and interference at the node, bins representing high or low power levels may have counts of zero—for example, some nodes may not experience one or both of the lowest and highest power levels in a measured dataset. S404 may not assign a centroid value to zero-count bins on the high and low sides of a set of bins.

Next, bins are clustered with the nearest centroid C at S406. Each of the bins may be clustered to the nearest centroid by determining the minimum distance to the N centroids, and then associating the bin with the centroid having the minimum distance. The distance $C_{i\_k}$ between the $i^{th}$ centroid $C_i$ and the $k^{th}$ bin_center_value can be computed as:

$$\text{distance } C_{i\_k} = \text{abs}((C_i - \text{bin\_center\_values}[k])) \quad [1]$$

In this equation, bin_center_values[ ] is a vector which contains the histogram bin center values, and abs( ) represents the absolute value. Hence, the k-th bin center value is assigned to the $C_i$ centroid when the following condition is met:

Arg Min(Distance $C_{i\_k}$) for all $C_i$ in $C$, where $C = \{C_1, C_2, C_3, C_4 \ldots C_m\}$.

Next, the centroids are updated at S408 by taking the average value of all the bin center values assigned to each centroid $C_i$ and weighting each bin center by its corresponding bin frequency values, as shown here:

$$c_{i\_updated} = \frac{\sum_{x=1} \text{bin\_center\_values}(x) * \text{bin\_frequency\_values}(x)}{\text{sum}(\text{bin\_frequency\_values})} \quad [2]$$

In this equation, the sum operator computes the sum( ) of the values in the vector. After calculating $C_{i\_updated}$, the centroids are rounded to the nearest bin centers, and the rounded values are the new centroid values $C_{i\_new}$.

The new centroid values $C_{i\_new}$ are then compared to the previous version of centroid values $C_i$ at S412. If the new centroid values $C_{i\_new}$ are the same as the previous values $C_i$, then they are outputted as final centroid values at S410. Outputting the final centroid values may include storing the final centroid values in a computer memory and showing the final values on an electronic display. On the other hand, if the new centroid values are different from the previous centroid values, then S406, S408 and S410 are iterated until the new centroid values match the previous centroid values.

The following example is provided to help understand how an embodiment of process 400 can be implemented. In the example, an interference received power histogram includes bin_center_values and bin_frequency_values as vectors, and process 400 is performed to cluster the data.

In the example, the number of clusters is set at 2 at S402. The bin_center_values and the bin_frequency_values that were used for this example are as follows:
bin_center_values=[−121.5, −120.5, −119.5, −118.5, −117.5, −116.5, −115.5, −114.5, −113.5, −112.5, −110.0, −106.0, −102.0, −98.0, −94.0, −90.0] in dBm; and
bin_frequency_values=[0, 0, 0, 0, 0, 45, 181401, 288563, 162343, 95202, 140035, 24258, 4617, 1869, 882, 760].

Values for the two centroids are determined at S404 as bin centers that are distributed between the non-zero bins. The first five bins are empty, so the centroids are initialized as bin values that are distributed among the non-zero bins. Here, the centroids are initialized at −114.5 dBm as centroid 1, which corresponds to the bin containing 288563 in the bin_frequency_values, and −106 dBm as centroid 2, which corresponds to the bin containing 24258 in the bin_frequency_values. Next, S406 is performed to determine distances between the centroids and the non-zero bins are calculated according to equation [1] above, and determining which centroid each bin is closest to.

Using the values of the example, the first non-zero bin −116.5 dBm, so the distance to the centroid −114.5 dBm is computed as follows:

abs(−114.5+116.5)=2

The next non-zero value bin value −115.5 dBm is:

abs(−114.5+115.5)=1

The remaining calculations are shown in the following Table 1:

| Non_ Zero Bin_values in dBm | Distances from Centroid 1 (−114.5 dBm) | Distances from Centroid 2 (−106 dBm) |
| --- | --- | --- |
| −116.5 | 2 | 10.5 |
| −115.5 | 1 | 9.5 |
| −114.5 | 0 | 8.5 |
| −113.5 | 1 | 7.5 |
| −112.5 | 7 | 6.5 |
| −110 | 4.5 | 4 |
| −106 | 8.5 | 0 |
| −102 | 12.5 | 4 |
| −98 | 14.5 | 8 |
| −94 | 18.5 | 12 |
| −90 | 22.5 | 16 |

The non-zero bin values are then assigned to the centroid which has the minimum distance value in the table above. In the example, bin −112.5 is assigned to centroid 1 since the distance to centroid 1 (2) is less than the distance to centroid 2 (6.5), while bin −110 is assigned to centroid 2 since that distance (4) is less than the distance to centroid 1 (4.5). In more detail, the bins having center values of [−116.5, −115.5, −114.5, −113.5, −112.5] dBm are assigned to centroid 1, and the bins having center values of [−110, −106, −102, −98, −94, −90] dBm are assigned to centroid 2.

Next, the centroid values are updated at S408 according to Equation 2 above. For the new centroid 1 the computation is:

$$\frac{(-(116.5*45) - (114.5*288563) - (115.5*181401) - (113.5*162343) - (112.5*95202))}{45 + 288563 + 181401 + 162343 + 95202} = -114.2$$

For the new centroid 2 the computation is:

$$\frac{(-(110*140035) - (106*24258) - (102*4617) - (98*1869) - (94*882) - (90*760))}{140035 + 24258 + 4617 + 1869 + 882 + 760} = -108.9$$

The centroids are optionally rounded to the closest value in the bin_center_values vector. Hence, new centroid 1 becomes −114.5 dBm and new centroid 2 becomes −110 dBm. These updated centroid values are then compared to the previous centroid values, which were −114.5 and −106. Since −110 is different from −106, the process would be performed again using the new centroid and iterated until the updated centroid values are the same as the previous centroid values.

Process 300 includes determining a quantity of clusters at S306. Determining a quantity of clusters may include determining an optimal number of clusters, K, by clustering data with different numbers of clusters, e.g. K=1, 2 and 3 clusters, and determining which of the sets of clusters provides the best clustering, or equivalently, which of the sets of clusters is optimal. One method of determining an optimal set of clusters is by calculating a silhouette score for each set of clusters. The set of clusters with the highest silhouette score is deemed to be the optimal clustering. Other methods of determining an optimal set of clusters such as the elbow method, or X-Means may also be used to determine the optimal number of clusters.

Figure 5:
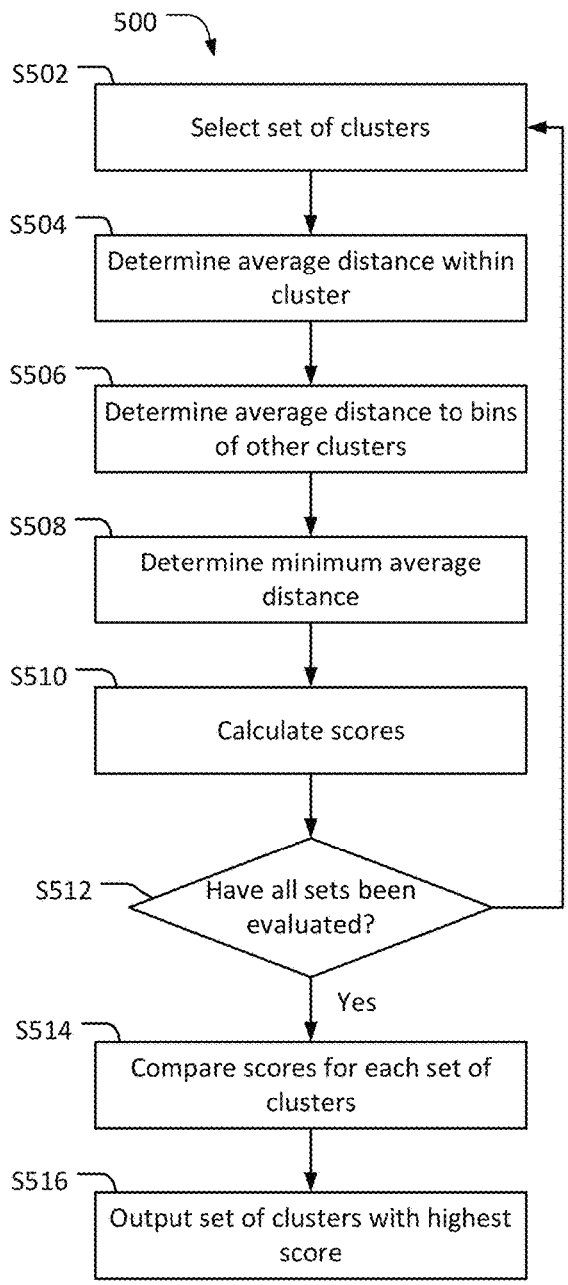
FIG. 5 illustrates an embodiment of a process for clustering performance data.

An example of a process 500 for determining an optimal number of clusters is shown in FIG. 5. The process may begin at S502 by selecting a set of clusters to evaluate. The set of clusters may be a set of 1, 2 or 3 clusters that were created by process 400 described above. Next, an average distance avgpcx that is the average of distances between the centroid of a cluster x and all the other bin center values in the cluster x may be determined at S504. Distances may be calculated as described in equation [1] above.

An average distance between a target cluster x and all of the elements in other clusters in the set of clusters is determined at S506. Hence, average distances avgpc1, avgpc2, . . . , avgpcN are obtained. A minimum of the average distances may then be determined at S508 as:

$$\text{minavg} = \text{argmin}(\text{avg}pc1, \text{avg}pc2, \text{avg}pcx, \ldots, \text{avg}pcN) \quad [3]$$

The average distances and minimum distances may then be used to calculate a score for the set of clusters at S510. The score for a given cluster may be calculated according to the following equation:

$$\text{avgsil\_cx} = 1 - \frac{\text{avg}pcx}{\text{minavg}} \quad [4]$$

Subsequently, the score for a set of N clusters may be computed as:

$$\text{mean}(\text{avgsil\_c1}, \text{avgsil\_c2}, \ldots, \text{avgsil\_cN}) \quad [5]$$

Elements S502 to S512 may be repeated until scores have been calculated for all sets of clusters. The scores for each set of clusters are then compared at S514, and the set of clusters with the highest score is determined as having the optimal number of clusters. The set of clusters with the highest score is then output at S516, which may include storing the clusters in a memory of a spectrum analytics server 140.

Process 500 provides a measure of how similar an object is to its own cluster when compared to other clusters. Although process 500 describes elements that overlap with calculating a silhouette score, embodiments are not limited to this process. For example, in other embodiments, a Dunn index may be calculated and used to determine an optimal number of clusters.

Three sets of clusters may be evaluated by process 500—a cluster set of 1 (K=1), a cluster set of 2 (K=2), and a cluster set of 3 (K=3). In an embodiment, the cluster set of 1 represents the presence of thermal noise, the cluster set of 2 represents a combination of noise and interference, and a cluster set of 3 represents a combination of noise, internal interference and external interference. Hence, finding the optimal number of clusters can be used to determine whether internal and external interference is present in the received interference power histogram.

When N=1 and a silhouette score is used, the score may be set to 0.7 by default. This is because when N=1 there will not be any other clusters available to perform the similarity comparison. In an embodiment, a value of 0.7 value is the minimum threshold value for determining whether the number of clusters in a set is an accurate representation of an RF environment. Therefore, in an embodiment that uses a silhouette score, when scores of cluster sets of 2 and 3 clusters are less than 0.7, then the set of 1 cluster is determined to be an optimal representation of the radio environment for a cell. However, other threshold values are possible—for example, 0.6 may be used in another embodiment. The set of clusters (N=1, 2 or 3) with the highest score from S510 may be chosen as the set that best represents a cell's radio environment, and subsequent processes are performed using this set.

In an embodiment, elements of process 400 and process 500 are repeated using different initial centroid values at S404 for each value of K. The final centroid values are influenced by the initial centroid values, so process 400 may be performed for a given value of K using various initial centroid values. In such an embodiment, the different centroid sets for a given K value may be compared to one another, e.g. by calculating silhouette scores for each set, and the set with the highest score may be chosen as the representative set for the respective K value.

After an accurate number of clusters for the measured data has been determined, embodiments of the present disclosure may determine interference and noise components of the measured data at S308. In particular, clusters that represent interference are separated from clusters that represent thermal noise at S308.

Each cluster in a set of clusters may be evaluated by comparing the center value for the cluster to a threshold value. The threshold values may be different for different communication technologies. For example, the threshold value for noise at an LTE cell may use a threshold value of −115 dBm/180 kHz, and a threshold value for UMTS may be −102 dBm/3.84 MHz. The exact threshold values to determine whether a cluster represents noise for a given cell may be selected based on environmental factors, technology, characteristics of the cluster, machine learning, etc. When machine learning is used, the implementation may be trained by using validated data, e.g. data whose accuracy has been confirmed by identifying sources of interference through additional testing, which may include deploying personnel to interference locations.

When two clusters of a set of clusters are both below the threshold value, then both of those clusters may be determined to represent noise. An exception may occur, for example, when one of the clusters is significantly below a noise threshold and a second cluster is relatively close to a noise threshold—in such a case, the close cluster may represent interference. Therefore, in some embodiments, a second, e.g. lower, threshold value for noise is used when two clusters are below a first threshold value.

Figure 6:
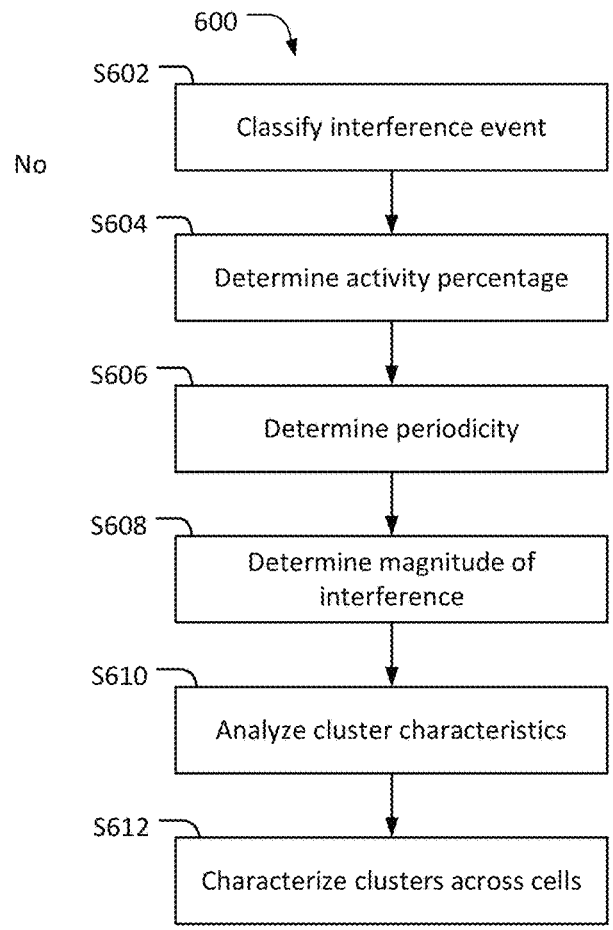
FIG. 6 illustrates an embodiment of a process for a process for characterizing interference.

Clusters that represent interference may be used to characterize the interference at S310. An embodiment of a process 600 for characterizing interference is shown in FIG. 6.

In some embodiments, clusters across multiple ROPs are classified as an event at S602. An event may be classified, for example, by identifying clusters having similar characteristics for one or more neighboring cells. Clusters with similar center values and affected frequencies over multiple consecutive ROPs may be related to the same event, so classifying an event at S602 may include comparing characteristics of clusters over multiple ROPs.

An activity level of interference may be determined at S604. In an embodiment, the activity level is a percentage of time that the interference is active in a time period, which may be one or more ROP. The activity level may be referred to as an Event Active Percentage Value (EAPV).

An EAPV may be based on a percentage of samples of the received interference power which do not represent thermal noise. An EAPV may be determined on a per-ROP basis by using the bin_frequency_values (bfv) from an active interference vector and the bin frequency values from a thermal noise component vector, which may be expressed as a bfv_active_interference_vector and bfv_thermal_noise_component_vector, respectively. For example, an EAPV may be determined according to the following equation:

$$EAPV = \frac{\text{sum}(\text{bfv\_active\_interference\_vector})}{\text{sum}(\text{bfv\_active\_interference\_vector}) + \text{sum}(\text{bfv\_thermal\_noise\_component\_vector})} \quad [6]$$

In this equation, the sum( ) operator computes the sum of the values in the vector.

An EAPV value may be determined from all interference clusters at a cell, or clusters for single event as determined at S602. EAPV values may be obtained on a per ROP basis, or a per-event basis. For a time-interval bigger than a single ROP, an EAPV vector can be created as an array of EAPV values for each ROP of the time-interval as expressed by:

$$\text{EAPV\_Vector}[t] = EAPV(t), \text{ where } t \in [t1, t2] \text{ is the time interval.} \quad [7]$$

A magnitude of interference detected by a cell may be determined at S608. In an embodiment, the magnitude of interference may be referred to as Event Average Interference Magnitude (EAIM), which may be determined based on analyzing center values and bin counts of one or more cluster associated with interference. In a specific embodiment, an EAIM value may be determined using the bin_center_values (bcv) of the active_interference_vector, bcv_active_interference_vector, which are multiplied by its respective bin frequency value as shown in the following equation:

$$EAPV = \frac{\sum_{x=1} \text{bcv\_active\_interference\_vector}(x) * \text{bfv\_active\_interference\_vector}(x)}{\text{sum}(\text{bfv\_active\_interference\_vector})} \quad [8]$$

In this equation, sum ( ) represents the sum operator, bcv_active_interference_vector represents the bin_center_values of the active_interference_vector and bfv_active_interference_vector represents the bin_frequency_values of the active interference vector.

When an event spans across multiple ROPs, the EAIM_Vector can be expressed as:

$$\text{EAIM\_Vector}[t] = \text{EAIM}(t) \text{ where } t \in [t1, t2]. \quad [9]$$

In some embodiments, EAPV and EAIM values may be determined for all interference, e.g. all clusters that do not represent noise, or independently for all clusters above the noise threshold. In more detail, if clusters are classified as relating to a single event as described with respect to S602, EAPV and EAIM values may be determined for the single event.

Characterizing the interference in process 600 may further include determining characteristics of the clusters at S610. For example, clusters representing interference may be analyzed to determine characteristics such as minimum and maximum values in the clusters, spread of the clusters, skewness, or other statistical characteristics. These characteristics can be useful for determining a source of interference, e.g. determining whether clusters represent interference, as well as a potential source of interference represented by a cluster. In addition, these characteristics can be useful for determining whether clusters from multiple ROPs represent the same event.

Clusters may be characterized across multiple cells at S612. For example, clusters may be compared between multiple cells at a single base station, e.g. co-sited cells, between neighboring or nearby base stations, and between overlapping or nearby cells. A single source of external interference may cause interference within a relatively limited area that only affects one or a few base stations or cells, so determining that similar clusters are present at such base stations or cells can be useful to identify and locate a source of interference. In another example, detecting an event of similar magnitude that affects multiple neighboring cells across all frequencies is a likely indicator of a broadband interferer. Accordingly, characterizing clusters may be useful to indicate a source of interference at S312.

Figure 7:
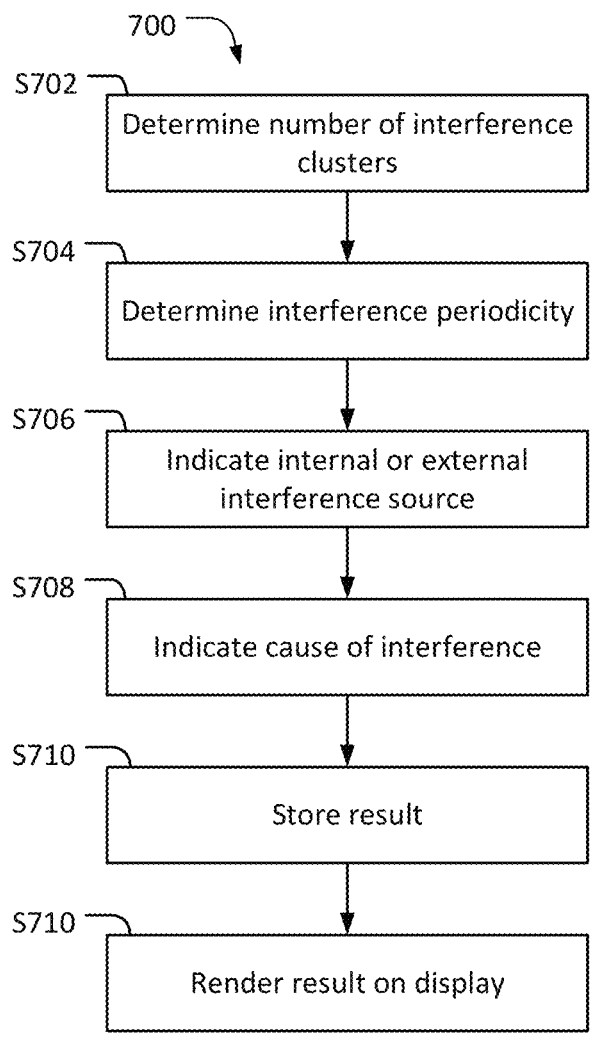
FIG. 7 illustrates an embodiment of a process for indicating a source of interference.

Additional elements of indicating a source of interference at S312 are shown in process 700, which is illustrated in FIG. 7. Indicating a source of interference may include indicating whether a cell is being affected by interference from within the network, interference from a source outside of the network, or both. In addition, indicating sources of interference may include indicating possible or likely causes of interference, such as a broadband source of interference, and other characteristics of the interference that may be useful to identify and resolve the interference.

Indicating sources of interference may include determining the number of clusters that are present at a cell at S702. When a cell has two clusters that are above the noise threshold, then it can be assumed that one cluster represents interference from within the network, and the other cluster represents interference from an external source. Similarly, the presence of only one cluster above the noise threshold may represent interference from within the network. Accordingly, when two clusters are present in measurements from a cell, process 700 may indicate that the cell is being affected by external interference, and when one cluster is present, process 700 may indicate that the cell is being affected by interference from within the network. S702 may include labeling clusters as indicating external or internal interference, e.g. by assigning a label to the clusters and storing the association in a memory.

Interference sources may be indicated by determining periodicity of interference events at S704. In an embodiment, this may be accomplished by determining an Event Active Percentage Value Period (EAPVP), which is a time period over which an EAPV remains semi-constant during the time interval where the interference event is measured. The continuity of an EAPV can be determined based on deviations between clusters across multiple ROPs. In a specific embodiment, an event has continuity if std (EAPV_Vector)<threshold, where the std( ) operator indicates the standard deviation for the EAPV_Vector. In an embodiment, the threshold is a value from 5 to 10. If an event is found to have continuity, the EAPVP may be determined as EAPVP=mean (EAPV_Vector). Elements of S704 may overlap with elements of classifying an interference event at S602.

In an embodiment, event periodicity may be determined at S704 using autocorrelation. For example, an embodiment may determine an Event Active Percentage Value Autocorrelation Period (EAPVAP). An EAPVAP is the mean of the difference expressed in a number of ROPs between the peaks of an autocorrelation of an EAPV. An example of such an autocorrelation is shown in FIG. 8. The EAPVAP value can be used to obtain the periodicity of an interference event.

The periodicity obtained at S704 can be used to indicate whether a source of interference is internal or external to a network at S706. Interference caused by normal network traffic tends to have a periodicity of 24 hours, so a periodicity of other than 24 hours typically indicates the presence of a source of external interference.

Other factors may influence event periodicity—for example, large gatherings of mobile device users such as at sporting events, concerts and parades have periodicity of less than 24 hours. In addition, certain external interference sources such as lighting and passive intermodular interference (PIM) often have 24-hour periodicity. Therefore, additional variables may be taken into account when determining that an event with a periodicity of other than 24 hours indicates an external source of interference.

When an event is found to be constant over an extended period of time, e.g. clusters with similar characteristics have a standard deviation below a threshold value—then the event may be classified as being caused by an external source of interference.

Figure 8A:
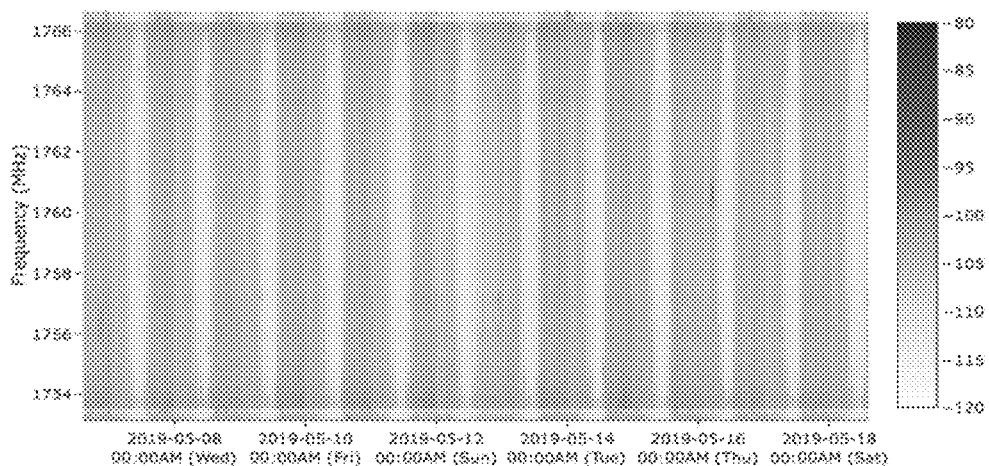
FIGS. 8A, 8B and 8C shows an example of interference affecting a cell.
Figure 8B:
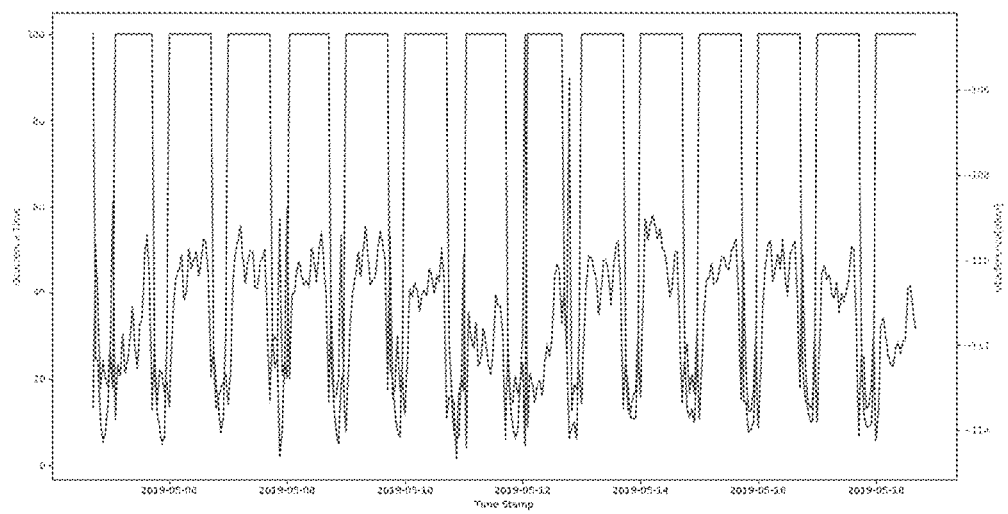
Figure 8C:
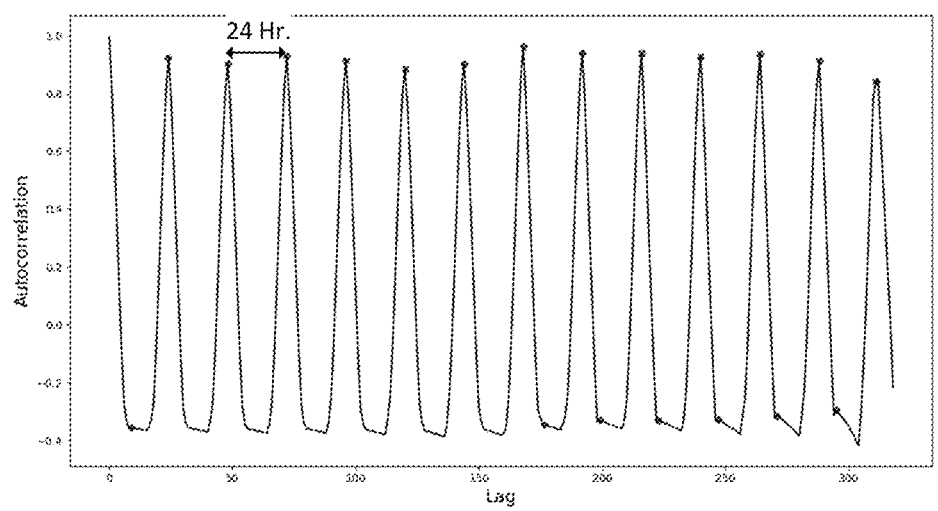

FIGS. 8A-8C show an example of indicating whether interference is external interference or internal interference. FIG. 8A shows RF energy data collected at a cell over several days, and FIG. 8B illustrates interference levels of a RAN event at the cell, including EAPV values from 0 to 100 and average interference levels in dBm. FIG. 8C shows the result of an autocorrelation of the data in FIG. 8B. In the example of FIG. 8C, the difference between peaks of the autocorrelation is 24 hours, so the source of interference can be indicated as internal, or network interference.

Figure 9A:
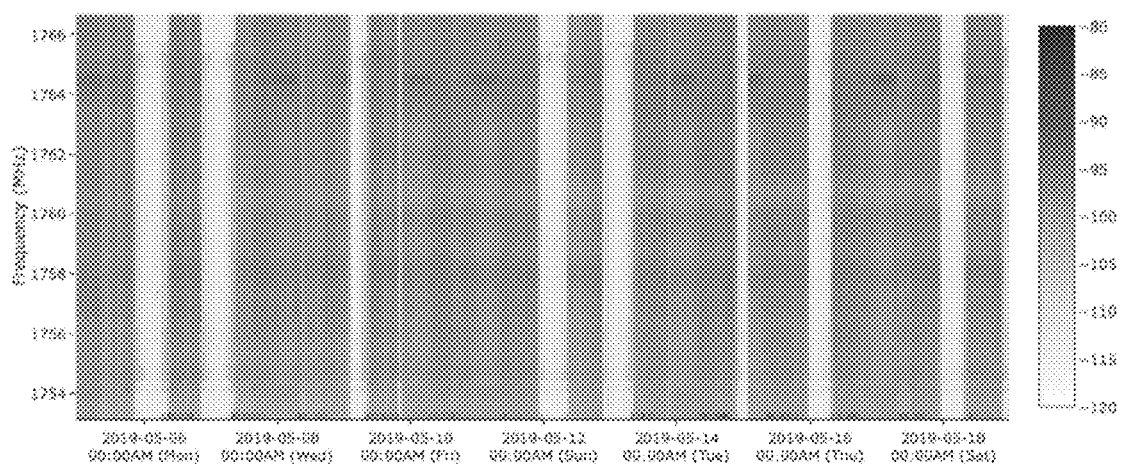
FIGS. 9A, 9B and 9C shows an example of another interference affecting a cell.
Figure 9B:
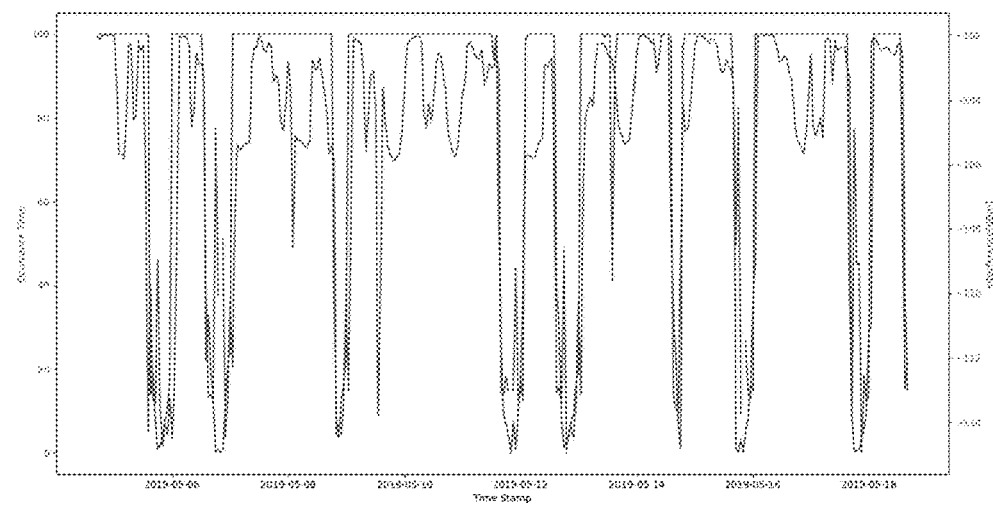
Figure 9C:
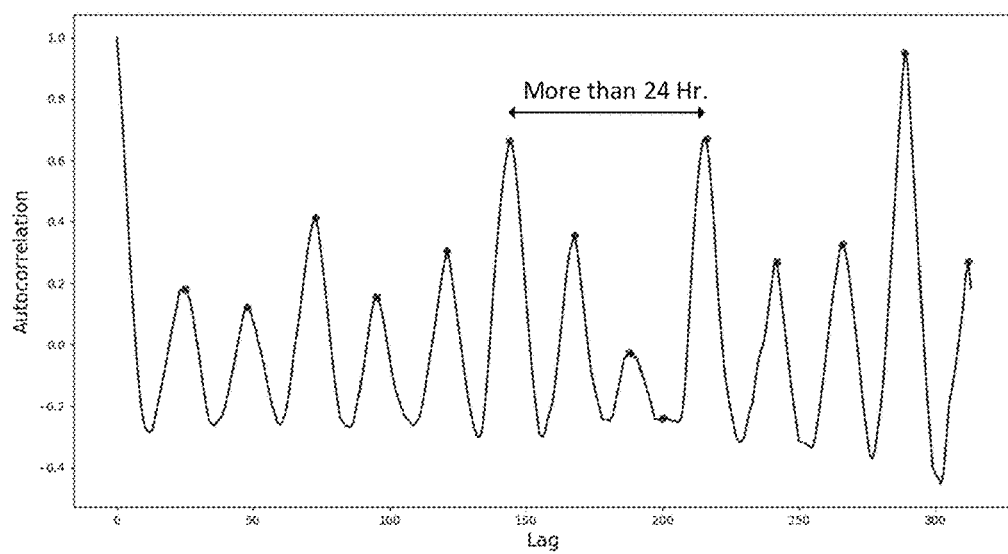

In contrast, FIG. 9B shows EAPV values and average energy levels for interference caused by PIM. FIG. 9A shows the RF energy data associated with the event, and FIG. 9C shows an autocorrelation of the data from FIG. 9B. The difference between the peaks that show high autocorrelation is greater than 24 hours, so the event can be indicated as interference from a source that is external to the network.

Figure 10A:
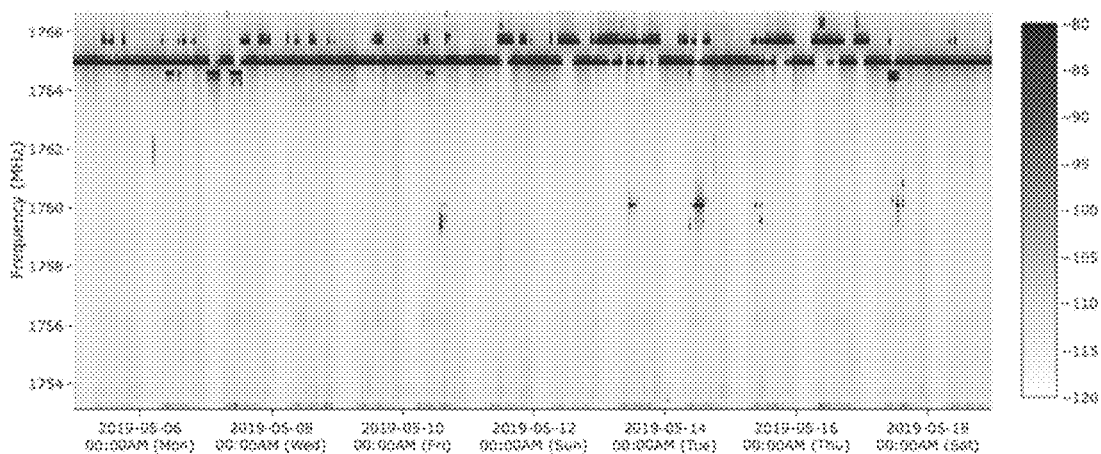
FIGS. 10A, 10B and 10C shows an example of another interference affecting a cell.
Figure 10B:
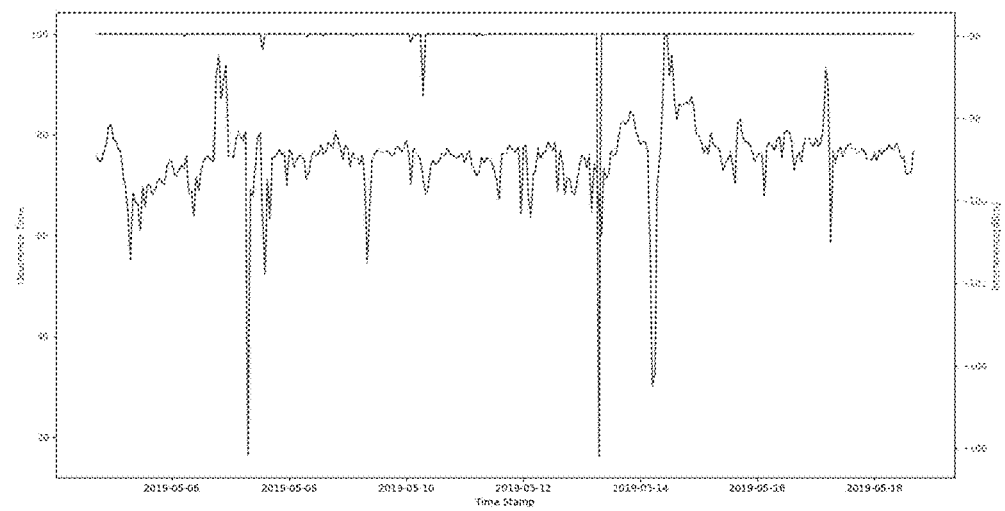
Figure 10C:
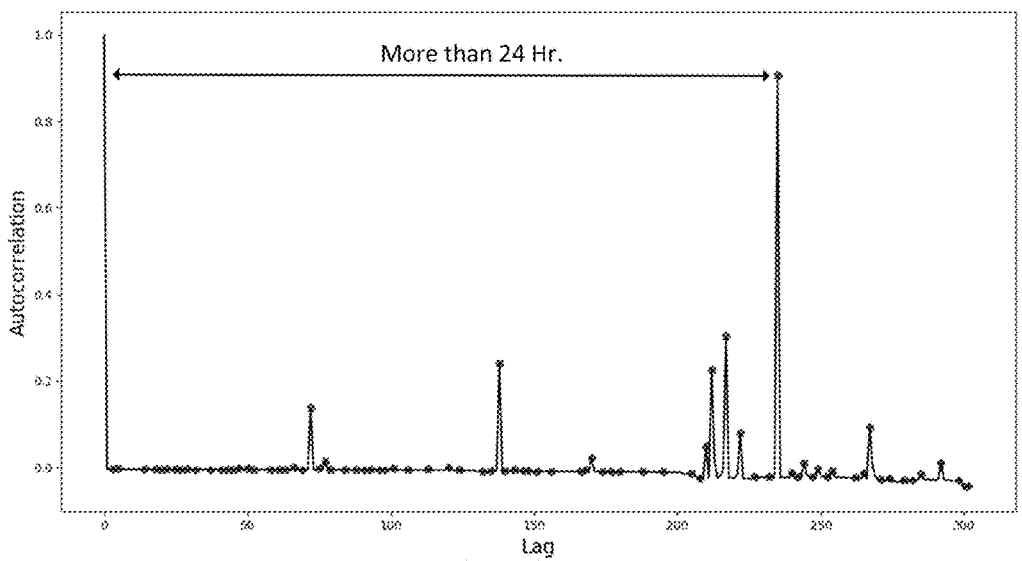

FIGS. 10A-10C show another example of data for interference from an external source. FIG. 10A shows the raw data, FIG. 10B shows EAPV and interference levels, and FIG. 10C shows an autocorrelation result that is significantly longer than 24 hours. Accordingly, the interference shown in FIGS. 10A-10C can be indicated as external interference.

Figure 11:
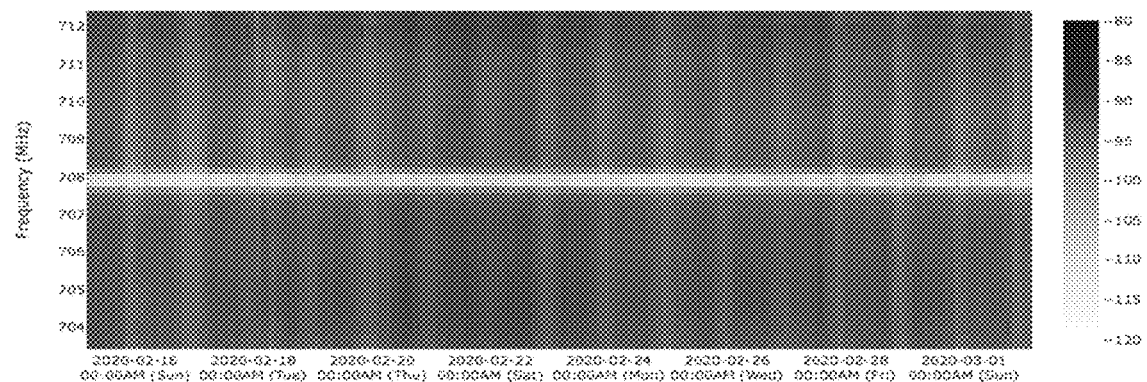
FIGS. 11, 12 and 13 illustrate embodiments of interference from external sources.

Embodiments of the present application may identify a cause of the interference at S708. Some sources of interference have characteristics including EAPV and EAIM values that can used to identify the cause, or source, with a high degree of probability. For example, FIG. 11 shows an example of spectral measurements of cable television egress. The interference of FIG. 11 is present in LTE band 28 (743 MHz), and an EAPV of 100% and a duration of 100%. These characteristics are typical to cable TV egress, and can be used to identify cable television transmissions as being the cause of interference.

Figure 12:
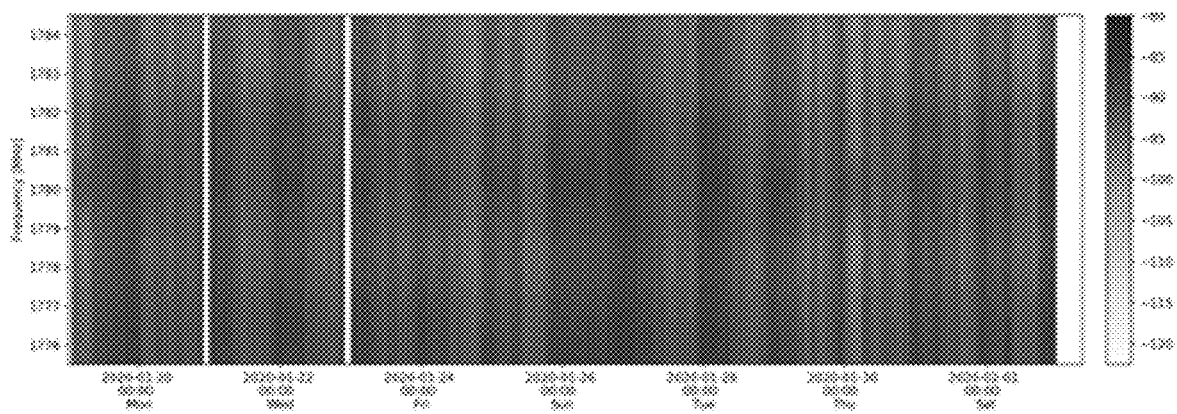
Figure 13:
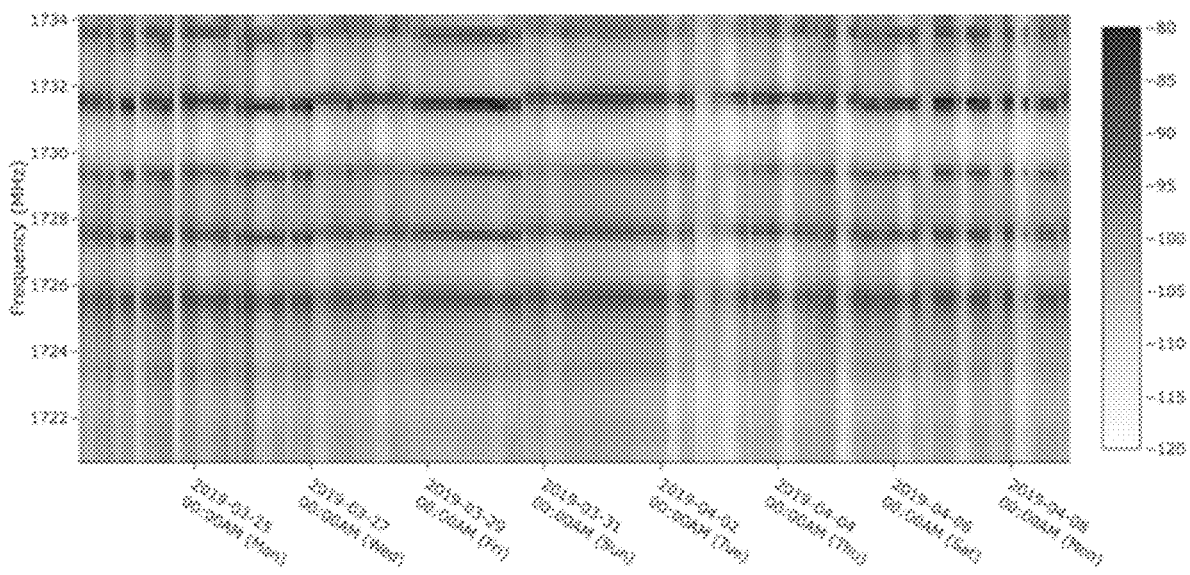

Similarly, FIG. 12 is spectral data for interference in LTE band 3 (1780 MHz) that has a duration of 100% and an EAPV value of 98%. These characteristics can be used to identify the cause of interference as an RF jammer. In the example of FIG. 13, the interference has a duration of 100% and an EAPV value of 30% and affects 8 cells at 4 sites. The interference is present in the LTE band at 1727.5 MHz, and the origin of the interference of FIG. 13 is an air conditioning system.

Additional elements of indicating a source of interference may include storing information from analyzing events in a memory at S710, and rendering the results on an electronic display at S712. The results may include one or more of the characteristics of interference events described above, such as whether the interference is internal or external to the network, frequencies affected by the interference, periodicity of the interference, etc.

In some embodiments, interference is resolved at S314. For example, an operator may adjust network parameters to mitigate the effects of interference. When an external source of interference is indicated, an operator may deploy personnel to a region associated with the interference to eliminate the interference.

Spatial characteristics of interference can be useful for identifying a source of the interference. For example, when interference is present in a limited geographical area, it will only affect nodes in that geographic area.

In an embodiment, determining the spatial characteristics of interference includes determining spatial characteristics of cells associated with clusters with similar characteristics. The spatial characteristics may include a location of an antenna providing service to the cell.

A number of interference characteristics of a source of interference can be determined from embodiments of this disclosure, such as magnitude and frequency. This information may then be correlated with a list of known, pre-characterized interference sources to aid network operators in the detection of the interference source. This data, which may include raw data, reports, etc., may be used by network operator personnel to identify and eliminate sources of interference that are negatively affecting network performance.

Embodiments of the present disclosure can be used to identify the location of a source of interference. The localization process may include triangulation or trilateration based on location, as well as antenna pointing angles and the detected noise amplitudes of each affected cell.

Figure 14:
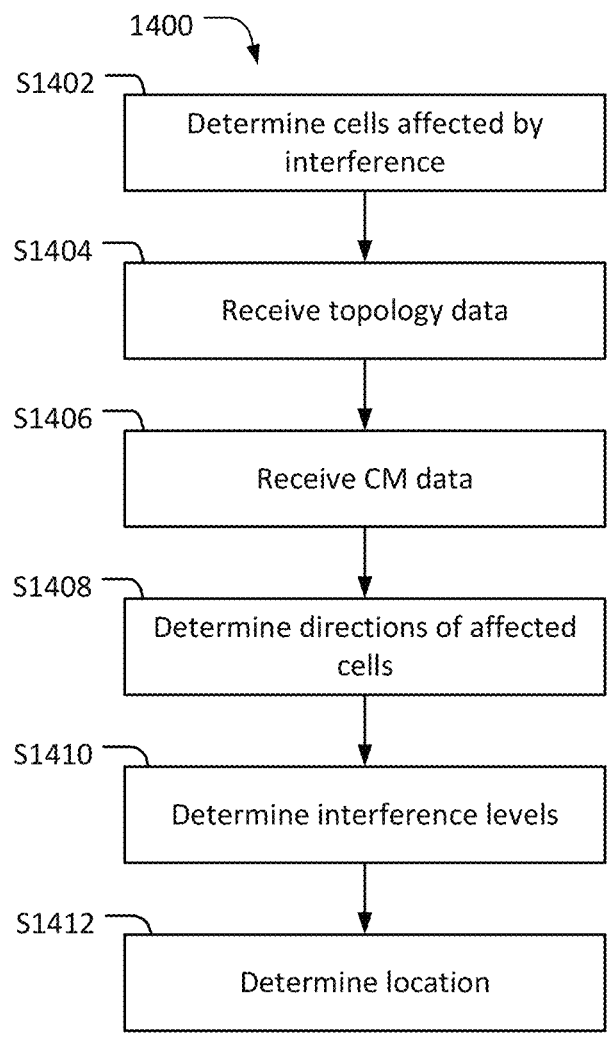
FIG. 14 illustrates an embodiment of a process for locating a source of interference.

FIG. 14 shows an embodiment of a process 1400 for determining a location of an interference source. A plurality of cells that are affected by interference are determined at S1402 by performing process 300 as described above.

Network topology data is received at S1404. The network topology data may include geographical coordinates of the cells that are affected by interference, which may be expressed as latitude and longitude coordinates for each cell. Additional topology data may include elevation data for the cells, and data related to the surrounding network environment that could affect RF propagation, such as locations of commercial structures, bodies of water, etc.

Configuration Management (CM) data is received at S1406. The CM data may include, for example, frequencies used by the cells, pointing directions, azimuth, elevation, half-power beamwidth, transmission power, etc. The CM data may be received in response to a request specifically transmitted for process 1400 or may be stored by a spectrum analytics server 140 for use in multiple processes.

Figure 15:
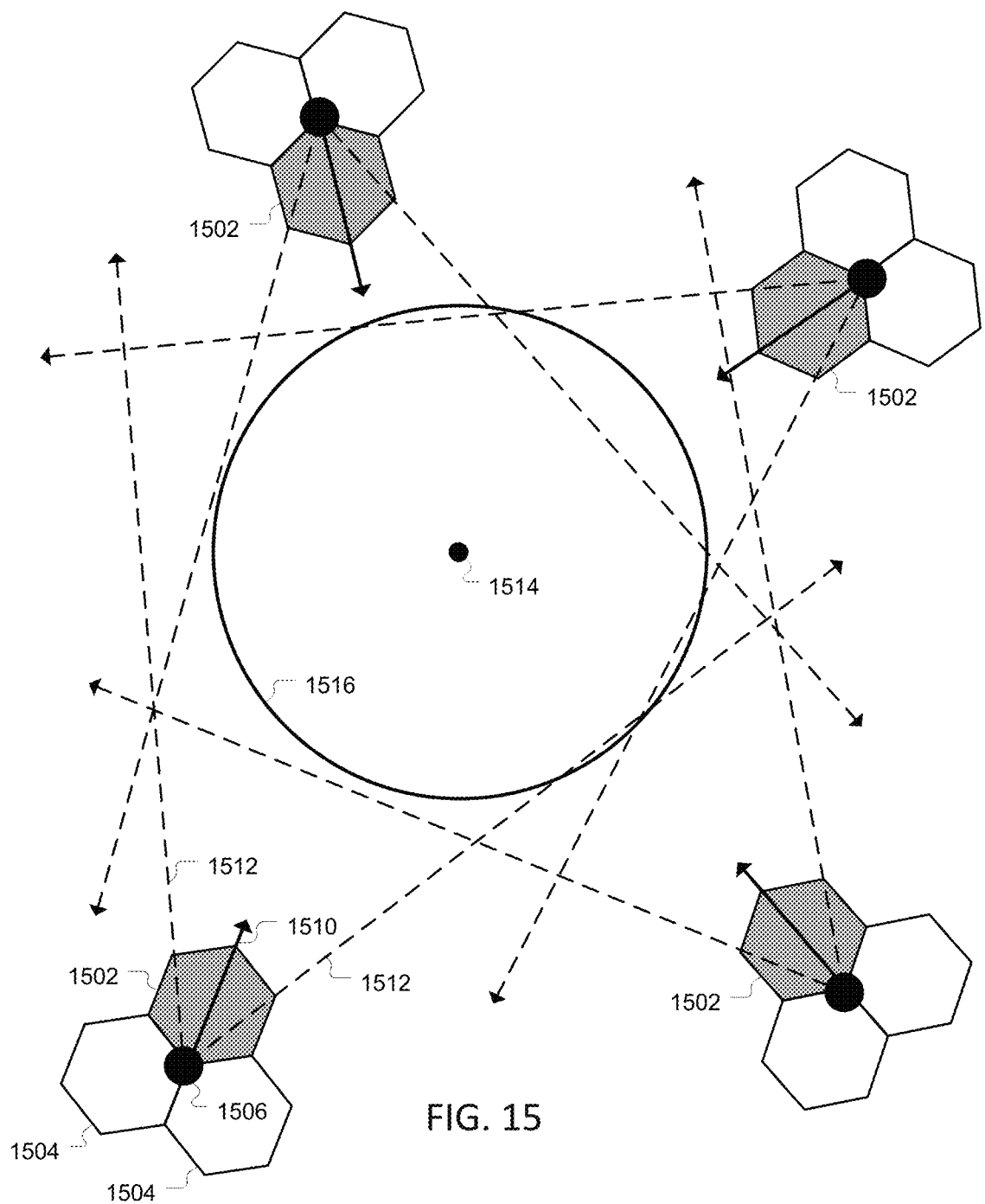
FIG. 15 illustrates an embodiment of locating a source of interference.

FIG. 15 shows a plurality of cells 1502 that are affected by interference. One of the cells 1502 may be a target cell, while the other cells are neighbor cells that are correlated with the target cell. Co-site cells 1504 of a cell site 1506 are shown in FIG. 15 as well, but for the purposes of this example they are not affected by interference.

The direction 1510 of cells 1502 that are affected by interference are determined at S1408. While FIG. 15 shows direction 1510 as being the pointing direction of antennas, or azimuth, embodiments may determine additional direction information at S1408. For example, half-power beamwidth may be determined in order to establish antenna transmission areas 1512, which may vary between cells according to transmission power.

Interference amplitude of affected cells is determined at 51410. In an embodiment, interference levels may be extracted from network event recordings. The magnitude of interference can be used as a proxy for distance from the cells to localize an interference source. In particular, the EAIM value may be used to represent the interference magnitude, which is substantially more accurate than the conventional measure of average interference levels.

The location of a source of interference is determined at S1414. In an embodiment, a location is a point 1514 that is determined to have the highest probability of being the source of the interference based on analyzing the cell data in process 1400. However, the location data may be presented in many different ways.

For example, in one embodiment, the location data is an area 1516. The area 1516 may be determined from a statistical process, such as a probability value, where data analysis suggests that there is, for example, a 90% probability that a source of interference is within the area. In other embodiments, the location data may be expressed as an asymmetric heat map, a plurality of concentric circles or other shapes representing a distribution of probabilities, etc.

The accuracy of interference localization depends on the number of and location of correlated high noise rise neighbor cells, as well as the amount of available data for the cells, such as pointing direction and half-power beamwidth. Persons of skill in the art will recognize that a number of different approaches can be taken to calculate location using cell data, such as triangulation, trilateration, etc. Examples of some of the techniques that could be employed can be found, for example, in U.S. Pat. No. 9,942,775.

When one or more target cell is classified as being affected by regional interference, personnel can use the localization information, such as a localization map or geographic coordinates, to identify a specific area as having the highest probability of being the location of the source of interference. Process 1400 may further characterize the interference with, for example, time and frequency information, that can help a network operator rapidly and efficiently identify its source. For example, time, amplitude and frequency characteristics can be used to determine that interference is from a predetermined source, such as a sparking electrical coupling or a radar installation.

Embodiments of the present disclosure represent a number of improvements to existing wireless communication technology. For example, embodiments can indicate whether a base station is experiencing internal interference, external interference, or both with high accuracy using PM data.

Embodiments of the present disclosure are especially well suited to identifying, characterizing and localizing interference. Data suggests that from 5% to 10% of existing cells are under-performing as a result of unintentional non-cellular interference. The sources of such interference vary greatly, and include poorly insulated transformers, corroded connections, and unregulated transmitters.

An operator can use information from embodiments of this disclosure to deploy personnel to remedy the physical cause of interference, such as replacing an oxidized connector or notifying a power company of a malfunctioning component. An operator may be a licensor of RF spectrum that operates a cellular telecommunications network. Furthermore, embodiments of the present disclosure can analyze and characterize interference without requiring network service interruptions, and without installing additional energy sensing equipment in network areas.

In addition to interference identification, characterization and elimination, embodiments of this disclosure are applicable to the emerging field of spectrum sharing. In shared spectrum systems, multiple network operators, each maintaining their network, communications and sensing devices cooperatively, share specific blocks of radio frequency spectrum. In such a system it is beneficial to rapidly detect interference conflicts between various operators such that spectrum sharing policies can be updated in real-time to resolve such conflicts. Embodiments of this disclosure support spectrum sharing by providing network operations teams with analytical tools such that they can identify interference caused by other users transmitting in the associated spectrum bands.

What is claimed is:

1. A method for a wireless telecommunications network, the method comprising:
   measuring RF energy at a base station in the network at predetermined intervals over a plurality of consecutive time periods;
   for each time period:
      arranging binned values of the measured energy into at least one cluster;
      determining whether each cluster of the at least one cluster represents noise or interference; and
      characterizing the interference, and
      indicating a source of the interference.

2. The method of claim 1, wherein indicating the source of interference includes indicating whether the base station is experiencing interference from within the network; and indicating whether the base station is experiencing interference from a source external to the network.

3. The method of claim 1, wherein indicating the source of interference includes identifying the source of interference that is external to the network.

4. The method of claim 1, further comprising:
   determining a percentage of each of the time periods for which the base station is experiencing interference.

5. The method of claim 4, wherein each percentage is determined based on a number of measurements included in clusters representing interference.

6. The method of claim 1, wherein characterizing the interference includes determining a periodicity of the interference by identifying a set of clusters across the time periods, and performing autocorrelation on the set of clusters.

7. The method of claim 6, wherein characterizing the interference includes determining that the set of clusters represents interference from a source external to the network when the periodicity is more than or less than 24 hours.

8. The method of claim 6, wherein characterizing the interference includes determining that the set of clusters represents interference from within the network when the periodicity is 24 hours.

9. The method of claim 1, wherein characterizing the interference includes determining a magnitude of the interference using a product of bin center values and frequency values of bins in a cluster representing interference.

10. The method of claim 1, wherein characterizing the interference includes:
    determining which clusters of the at least one cluster represent interference; and
    labeling each cluster as a different type of interference.

11. The method of claim 10, wherein labeling each cluster as a different type of interference includes:
    when one cluster with a center value above a threshold value is present, determining that the one cluster represents interference from within the network.

12. The method of claim 10, wherein labeling each cluster as a different type of interference includes:
    when two clusters with a center values above a threshold value are present, determining that a first cluster of the two clusters represents interference from within the network, and determining that a second cluster of the two clusters represents interference from a source outside of the network.

13. A system comprising:
    at least one base station that measures RF energy at predetermined intervals over a plurality of consecutive time periods;
    one or more processors; and
    memory storing instructions that, when executed by the one or more processors, cause the system to:
    for each time period:
       arrange binned values of the measured energy into at least one cluster;
       determine whether each cluster of the at least one cluster represents noise or interference; and
       characterize the interference, and
       indicate a source of the interference.

14. The system of claim 13, wherein indicating the source of interference includes indicating whether the base station is experiencing interference from within the network or indicating whether the base station is experiencing interference from a source external to the network.

15. The system of claim 13, wherein indicating the source of interference includes identifying the source of interference that is external to the network.

16. The system of claim 13, wherein the instructions further cause the system to:
    determine a percentage of each of the time periods for which the base station is experiencing interference, wherein each percentage is determined based on a number of measurements included in clusters representing interference.

17. The system of claim 13, wherein characterizing the interference includes determining a periodicity of the interference by identifying a set of clusters across the time periods, and performing autocorrelation on the set of clusters.

18. The system of claim 17, wherein characterizing the interference includes determining that the set of clusters represents interference from within the network when the periodicity is 24 hours, and determining the set of clusters represents interference from a source external to the network when the periodicity is not 24 hours.

19. The system of claim 13, wherein characterizing the interference includes:
    determining which clusters of the at least one cluster represent interference; and
    labeling each cluster as a different type of interference.

20. The system of claim 13, wherein characterizing the interference includes determining a periodicity of the interference by identifying a set of clusters across the time periods, and performing autocorrelation on the set of clusters.

* * * * *